United States Patent
Li et al.

(10) Patent No.: US 8,914,742 B2
(45) Date of Patent: Dec. 16, 2014

(54) DISPLAY METHOD, DISPLAY APPARATUS AND ELECTRONIC DEVICE

(71) Applicants: Lenovo (Beijing) Co., Ltd., Beijing (CN); Beijing Lenovo Software Ltd., Haidian District, Beijing (CN)

(72) Inventors: Zhigang Li, Beijing (CN); Qi Guo, Beijing (CN); Jun Qiu, Beijing (CN)

(73) Assignees: Lenovo (Beijing) Co., Ltd., Beijing (CN); Beijing Lenovo Software Ltd., Beijing (CN)

( * ) Notice: Subject to any disclaimer, the term of this patent is extended or adjusted under 35 U.S.C. 154(b) by 253 days.

(21) Appl. No.: 13/687,917

(22) Filed: Nov. 28, 2012

(65) Prior Publication Data

US 2013/0139095 A1 May 30, 2013

(30) Foreign Application Priority Data

Nov. 28, 2011 (CN) .......................... 2011 1 0385148

(51) Int. Cl.
*G06F 3/00* (2006.01)
*G06F 3/0481* (2013.01)
*G06F 3/14* (2006.01)
*H04L 29/08* (2006.01)

(52) U.S. Cl.
CPC ............ *G06F 3/0481* (2013.01); *G06F 3/1454* (2013.01); *H04L 67/36* (2013.01)
USPC ............................ 715/778; 715/740; 715/741

(58) Field of Classification Search
CPC ...... G06F 3/0481; G06F 3/1454; H04L 67/36
USPC .......................................... 715/778, 740, 741
See application file for complete search history.

(56) References Cited

U.S. PATENT DOCUMENTS

| | | | | |
|---|---|---|---|---|
| 8,539,039 B2* | 9/2013 | Sheu et al. | ..................... | 709/217 |
| 8,578,333 B2* | 11/2013 | Sivadas et al. | ................ | 717/121 |
| 8,707,197 B2* | 4/2014 | Toyama et al. | ................ | 715/778 |
| 8,730,269 B2* | 5/2014 | Pinto et al. | ..................... | 345/684 |
| 8,762,540 B2* | 6/2014 | Hochmuth et al. | ........... | 709/227 |
| 8,762,544 B2* | 6/2014 | King | ............................. | 709/227 |
| 8,788,950 B2* | 7/2014 | Ivashin et al. | ................. | 715/753 |
| 8,819,139 B2* | 8/2014 | Chen et al. | ..................... | 709/204 |
| 8,839,138 B1* | 9/2014 | Pasqua | .......................... | 715/778 |
| 8,843,851 B1* | 9/2014 | Gotchy et al. | ................ | 715/819 |

\* cited by examiner

*Primary Examiner* — David Phantana Angkool
(74) *Attorney, Agent, or Firm* — Brinks Gilson & Lione; G. Peter Nichols

(57) ABSTRACT

A display method, a display apparatus and an electronic device are described. The display method is used in an electronic device. The display method includes displaying a first application-interface, wherein, first identifiers of at least one first application are displayed in a first display effect in the first application-interface, and the at least one first application is stored on server-side; receiving a selection input from a user; determining a target identifier in the first identifiers of the at least one first application according to the selection input; displaying a second application-interface, wherein, second identifiers of at least one second application are displayed in a second display effect in the second application-interface, and the at least one second application is stored on electronic-device-side; displaying the target identifier and the transformation process of the target identifier from the first display effect to the second display effect in the second application-interface.

18 Claims, 5 Drawing Sheets

DISPLAY METHOD, DISPLAY APPARATUS AND ELECTRONIC DEVICE

This application claims priority to CN 201110385148.8 filed on Nov. 28, 2011, the entire contents of which is incorporated herein by reference.

The present invention relates to a display method used in an electronic device, a display apparatus using the same display method, and an electronic device.

BACKGROUND

In recent years, in order to facilitate use for users and to meet personalized needs of users, a lot of websites provide users with a variety of applications, such as applications or widgets, that can be installed in electronic devices such as personal computers, portable computers, tablet computers, portable cellular phones, smart phones and portable music players, and the like. These applications or widgets are powerful in functions, user-friendly, and entertaining.

However, in an existing method for downloading an application, only by logging in a webpage of an application store, can users view applications provided in a website of the application store and make selections. Further, as the applications selected by a user are in downloading, the user needs to view prompt-information or download-progress bars to acquire the download-situation of the selected applications, but the prompt-information or the download-progress bars occupies a relatively large display area, which is disadvantageous to user in viewing other information on the current page while downloading the applications.

SUMMARY

Embodiments of the present invention aim at providing a display method and a corresponding display apparatus that are used in an electronic device, as well as an electronic device, to solve the above problems.

An embodiment of the invention provides a display method used in an electronic device. The display method comprises: displaying a first application-interface, wherein, first identifiers of at least one first application are displayed in a first display effect in the first application-interface, and the at least one first application is stored on server-side; receiving a selection input from a user; determining a target identifier in the first identifiers of the at least one first application according to the selection input; displaying a second application-interface, wherein, second identifiers of at least one second application are displayed in a second display effect in the second application-interface, and the at least one second application is stored on electronic-device-side; displaying the target identifier and the transformation process of the target identifier from the first display effect to the second display effect in the second application-interface.

Another embodiment of the present invention provides a display apparatus used in an electronic device. The display apparatus comprises: a display unit, configured for displaying a first application-interface, wherein, first identifiers of at least one first application are displayed in a first display effect in the first application-interface, and the at least one first application is stored on server-side; an input-receiving unit, configured for receiving a selection input from a user; an identifier-determining unit, configured for determining a target identifier in the first identifiers of the at least one first application according to the selection input; the display unit is also configured for displaying a second application-interface, wherein, second identifiers of at least one second application are displayed in a second display effect in the second application-interface, and the at least one second application is stored on electronic-device-side; the display unit is also configured for displaying the target identifier and the transformation process of the target identifier from the first display effect to the second display effect in the second application-interface.

Another embodiment of the present invention provides an electronic apparatus, which comprises: a display unit, configured for displaying a first application-interface, wherein, first identifiers of at least one first application are displayed in a first display effect in the first application-interface, and the at least one first application is stored on server-side; an input-receiving unit, configured for receiving a selection input from a user; a processing unit, comprising: a target-determining module, configured for determining a target identifier in the first identifiers of the at least one first application according to the selection input; the display unit is also configured for displaying a second application-interface, wherein, second identifiers of at least one second application are displayed in a second display effect in the second application-interface, and the at least one second application is stored on electronic-device-side; the display unit is also configured for displaying the target identifier and the transformation process of the target identifier from the first display effect to the second display effect in the second application-interface.

With the solutions provided by the above-mentioned embodiments of the present invention, when a user selects to download an application stored on server-side, he/she can acquire the download-situation of the application, just by viewing a display effect of an identifier corresponding to the application being downloaded; thus, the display interface during application-download is simplified, without affecting the user in viewing other displayed contents in the current page, and the user experience is improved.

BRIEF DESCRIPTION OF THE DRAWINGS

In order to more clearly illustrate the technical solution of the embodiments of the invention, the drawings needed for the description of the embodiments will be briefly introduced as below. The following description of the accompanying drawings is merely an exemplary embodiment of the present invention.

DETAILED DESCRIPTION OF THE PREFERRED EMBODIMENTS

Figure 1:
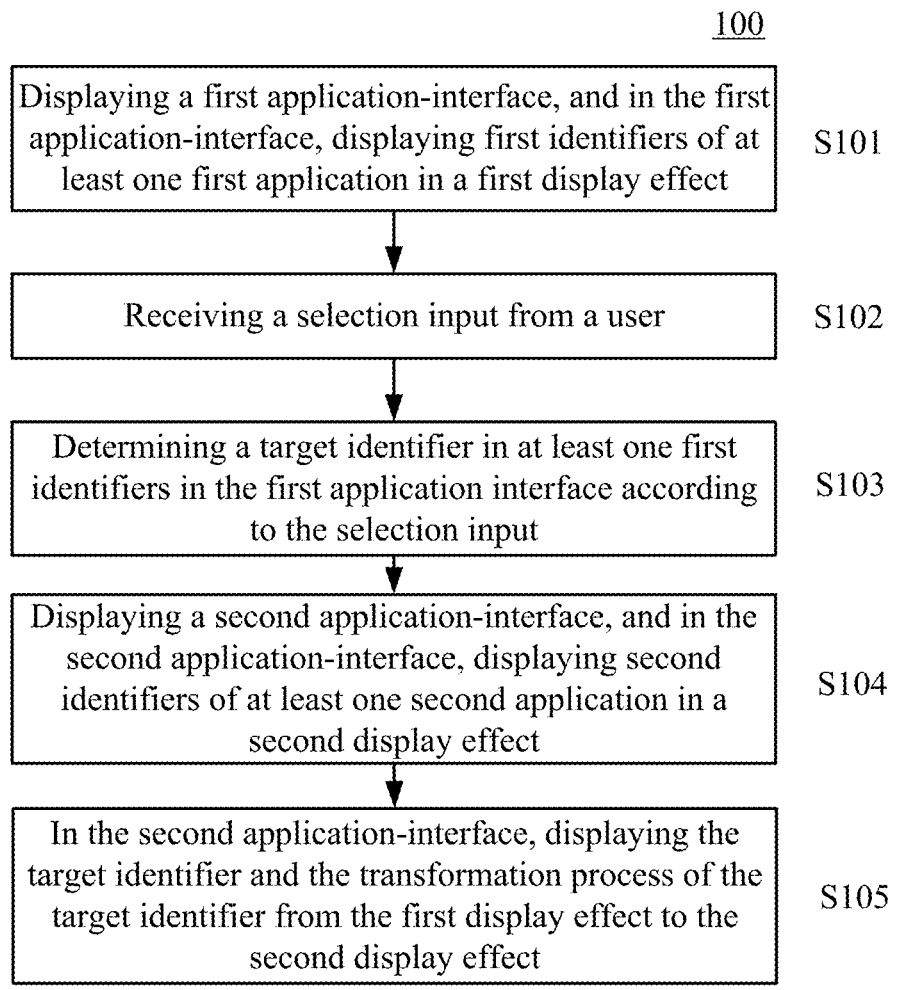
FIG. 1 is a flowchart depicting a display method in accordance with an embodiment of the present invention.

Hereinafter, detailed description of the preferred embodiments of the present invention will be given with reference to the accompanying drawings. It should be noted that, in this specification and the drawings, essentially identical steps and elements are represented with the same reference numerals, and repeated explanation of these steps and elements will be omitted.

In the following embodiments of the present invention, specific forms of an electronic device comprise, but not limited to, mobile telephones, personal computers, digital cameras, personal digital assistants, portable computers, game consoles, etc.

FIG. 1 is a flowchart depicting a display method 100 in accordance with an embodiment of the present invention. Below, the display method in accordance with the embodiment of the present invention will be described with reference to FIG. 1. The display method 100 may be used in an above-described electronic device.

As shown in FIG. 1, in step S101, a first application-interface is displayed. In the first application-interface, first identifiers of at least one first application may be displayed in a first display effect, and the at least one first application is stored on server-side. According to one example of the present invention, the first application-interface may be a recommended application-interface. The recommended application-interface can be used to display first identifiers of such first applications, for users, that are stored on server-side but not stored nor installed in the electronic device. According to another example of the present invention, displaying first identifiers of at least one first application in a first display effect may comprise: displaying first identifiers of at least one first application with a first luminance and/or a first chrominance. For example, first identifiers may be displayed with a relatively low luminance; also, first identifiers may be displayed with a black-white-grey color scheme.

Further, according to the another example of the present invention, before the first application-interface is displayed or when a user opens the first application-interface to display the interface, the method shown in FIG. 1 may further comprise: automatically receiving a prompt-information from an application of the server, and generating first application identifiers in the first application-interface according to the prompt-information. For example, the prompt-information of an application may be fed by the server to a terminal device based on the user's previous customized services, alternatively, may be directly sent from the server to the terminal device. In addition, the application corresponding to the prompt-information may be an application newly provided in a predefined time period (for example, within the past month) on server-side. Further, when the first application identifiers are generated in the first application-interface, a maximum number for the first identifiers in the first application-interface can be obtained (a maximum number can be preset for the first identifiers that can be placed in the first application-interface), and the number of the generated first application identifiers is less than or equal to a predefined maximum number of the first identifiers.

Usually, the number of applications stored on the server is quite large, and therefore there is a possibility that not all the identifiers of the applications stored on the server can be displayed in the first application-interface. According to another example of the present invention, in the first application-interface, there may also include an application-store identifier or an identifier indicating that there are more applications stored on server-side; when the user clicks on the identifier, the electronic device can open a link of the application-store and display a corresponding webpage.

In step S102, a selection input is received from a user. Then, in step S103, a target identifier in the at least one first identifiers in the first application-interface is determined according to the selection input. According to one example of the present invention, after the target identifier is determined, the electronic device can download an application corresponding to the target identifier from the server. In addition, according to another example of the present invention, after the electronic device has downloaded the application corresponding to the target identifier from the server, it can automatically install the application.

In step S104, a second application-interface is displayed. In the second application-interface, second identifiers of at least one second application are displayed in a second display effect, and the at least one second application is stored on electronic-device-side. According to one example of the present invention, the second application-interface may be a local application-interface. The local application-interface can be used to display second identifiers of the second applications stored in the electronic device for user. According to another example of the present invention, after the target identifier is determined in step S103, the first application-interface can be closed, and the second application-interface is displayed. Alternatively, after the target identifier is determined in step S103, the second application-interface can be opened while the first application-interface is not closed. Specifically, the second application-interface can be provided in an upper layer of the first application-interface.

According to another example of the present invention, displaying second identifiers of at least one second application in a second display effect may comprise: displaying second identifiers of at least one second application with a second luminance and/or a second chrominance. For example, second identifiers may be displayed with a normal luminance, which is higher than the above-mentioned relatively low luminance; also, second identifiers may be displayed with a chromatic color scheme.

In addition, according to another example of the present invention, switching between the first application-interface and the second application-interface can be done through an interface-switching input. For example, the first application-interface and the second application-interface may be arranged sequentially. The user can perform switching between the pages contained in the first application-interface, for example, with a page-switching input such as a sliding gesture and the like; and when the user conducts the above-described page-switching input such as a sliding gesture and the like in the last page of the first application-interface to view a next page, the first page of the second application-interface can be displayed. That is, the user can perform smooth switching between the first application-interface and the second application-interface, for example, with a page-switching input such as a sliding gesture and the like. Alternatively, the first application-interface and the second application-interface can be provided with a label respectively, and switching between the first application-interface and the second application-interface is done by selecting a label.

In step S105, the target identifier and the transformation process of the target identifier from the first display effect to the second display effect are displayed in the second application-interface. According to one example of the present invention, the target identifier can be replicated in the second application-interface, and after the target identifier is determined, when the second application-interface is opened, the target identifier can be displayed in the first display effect. Then, the display of the target identifier is transformed from the first display effect to the second display effect.

As described above, after a target identifier in the first identifiers of the at least one first application is determined according to the selection input, the method shown in FIG. 1 may further comprise downloading an application corresponding to the target identifier from the server. According to one example of the present invention, the transforming progress of the display of the target identifier from the first display effect to the second display effect may be determined according to the downloading progress of the application corresponding to the target identifier. For example, as described above, when the target identifier is displayed in the first display effect, the target identifier is displayed in gray, and the target identifier can be gradually turned into colorful along a top-to-bottom direction according to the downloading progress of the application corresponding to the target identifier. Specifically, as the downloading progress increases, the color proportion of the target identifier becomes larger gradually, until finally the entire target identifier turns into colorful, so as to notify the use that the application is completely downloaded to the local.

In addition, according to another example of the present invention, after the application corresponding to the target identifier is downloaded from the server, the method shown in FIG. 1 may further comprise: automatically installing the application corresponding to the target identifier. According to another example of the present invention, the transforming progress of the display of the target identifier from the first display effect to the second display effect may be determined according to the downloading and installing progress of the application corresponding to the target identifier. For example, as described above, when the target identifier is displayed in the first display effect, the target identifier is displayed in gray with a relatively dark luminance, and the target identifier can be gradually turned into colorful along a top-to-bottom direction according to the downloading progress of the application corresponding to the target identifier, meanwhile the target identifier is still displayed with a relatively dark luminance. Then, the target identifier can be gradually displayed with a normal luminance along a top-to-bottom direction, according to the installing progress of the application corresponding to the target identifier.

It should be noted that, although in the above examples, a description is given with the case that the display effect of the target identifier is transformed along a top-to-bottom direction as an example, the present invention however is not limited thereto, and for example, the display effect of the target identifier may also be transformed along other directions, such as a left-to-right direction.

In the display method according to this embodiment, when a user selects to download an application stored on server-side, he/she can acquire the download-situation of the application, just by viewing a display effect of an identifier corresponding to the application being downloaded; thus, the display interface during application-download is simplified, without affecting the user in viewing other displayed contents in the current page, and the user experience is improved.

In addition, according to another embodiment of the present invention, the method shown in FIG. 1 may further comprise: after a target identifier in the first identifiers of the at least one first application is determined according to the selection input, removing the target identifier from the first application-interface, so as to indicate that the target identifier has been selected by the user and will be downloaded to the terminal device.

The number of the first application identifiers in the first application-interface is less than the original number of the first identifiers in the first application-interface (for example, the maximum number of the first identifiers). At this time, the electronic device can supplementarily generate a new first application identifier in the first application-interface according to an prompt-information from the server. Thus, the number of the first application identifiers in the first application-interface is kept equal to the maximum number of the first identifiers in the first application-interface.

Figure 2A:
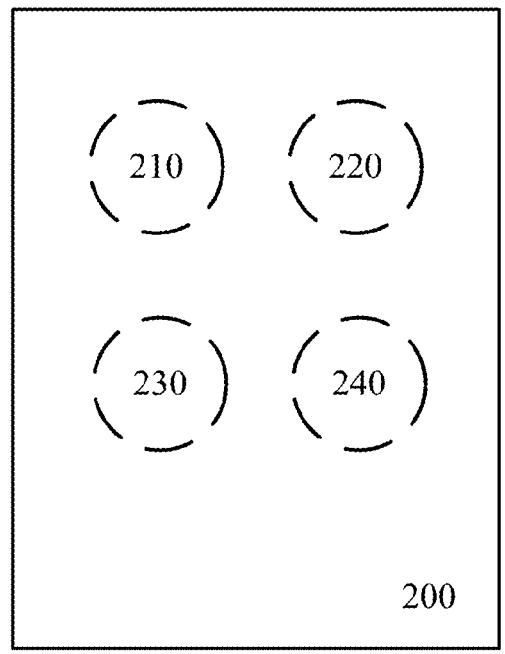
FIGS. 2A-2E are schematic diagrams illustrating a first application-interface and a second application interface in accordance with an embodiment of the present invention.
Figure 2B:
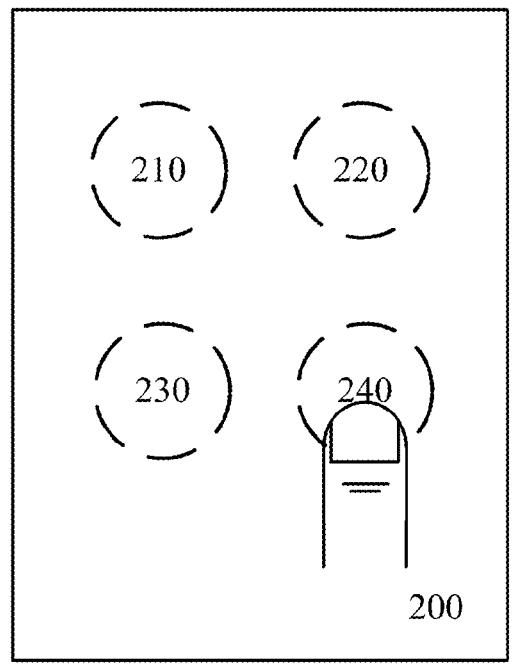

FIGS. 2A-2E are schematic diagrams illustrating a first application-interface 200 and a second application-interface 300 in accordance with an embodiment of the present invention. In this embodiment, a description will be given with the case that the identifiers of an application are icons as an example. Below, with reference to FIGS. 2A-2E, an example of the display method 100 described in FIG. 1 will be described. As shown in FIG. 2A, in accordance with step S101 in FIG. 1, a first application-interface 200 is displayed. In the first application-interface 200, first identifier 210, 220, 230, 240 of a first application stored on sever-side can be displayed in a first display effect (for example a first transparency, as shown by a broken line in FIG. 2A). As shown in FIG. 2B, in accordance with step S102 in FIG. 1, a selection input is received from a user. And in accordance with step S103 in FIG. 1, a target identifier 240 in the first identifiers 210, 220, 230, 240 is determined according to the selection input. In this embodiment, after the target identifier 240 is determined, the electronic device can download an application corresponding to the target identifier 240 from the server.

Figure 2C:
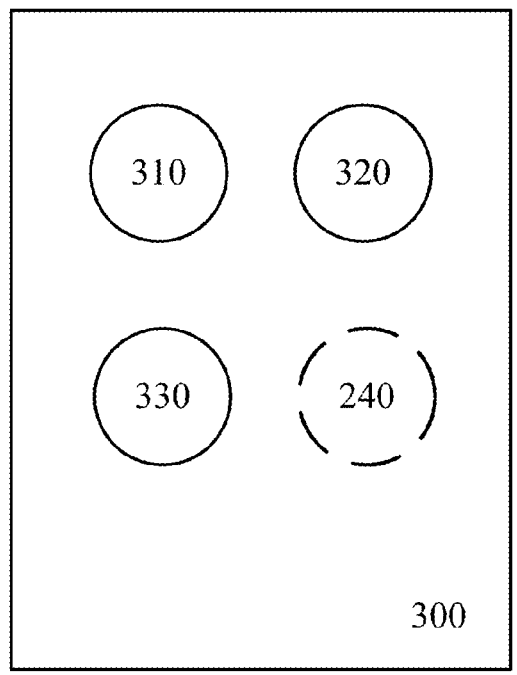

As shown in FIG. 2C, in accordance with step S104 and step S105 in FIG. 1, a second application-interface is displayed, and the target identifier 240 is displayed in the second application-interface in a first display. In the second application-interface 300, second identifier 310, 320, 330 of a second application stored on electronic-device-side is displayed in a second display effect (for example a second transparency, as shown in FIG. 2C).

Figure 2D:
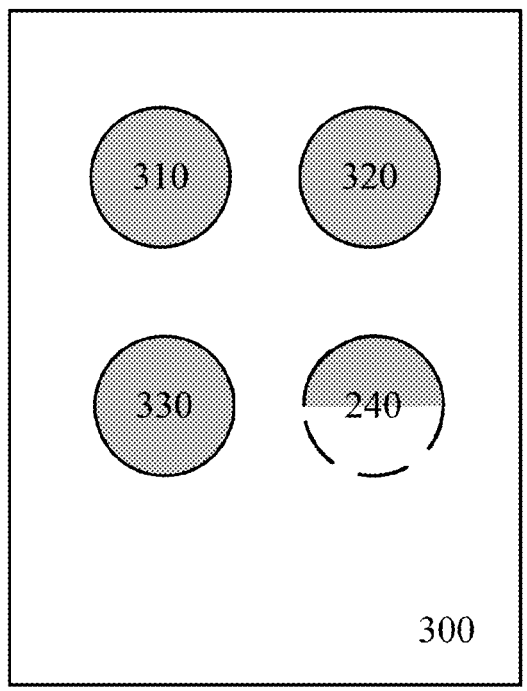
Figure 2E:
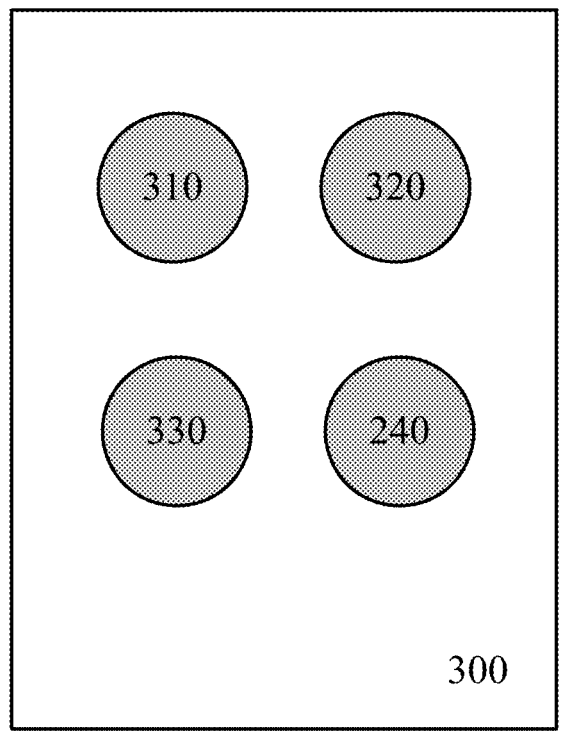

As shown in FIG. 2D, in accordance with step S105 in FIG. 1, the transformation process of the target identifier from the first display effect to the second display effect is displayed. In this embodiment, the transforming progress of the display of the target identifier from the first display effect to the second display effect is determined according to the downloading progress of the application corresponding to the target identifier. For example, in the example shown in FIG. 2D, when the downloading progress of the application corresponding to the target identifier is 50%, the target icon 240 is displayed with its upper half portion in the second display effect target, and the lower half portion of the target icon 240 is still displayed in the first display effect. And as shown in FIG. 2E, when the application corresponding to the target identifier is completed downloading, the application corresponding to the target icon 240 is stored in the electronic device, that is, the application corresponding to the target icon 240 is changed from a first application to a second application, and therefore the target icon 240 is displayed in the second display effect.

Figure 3:
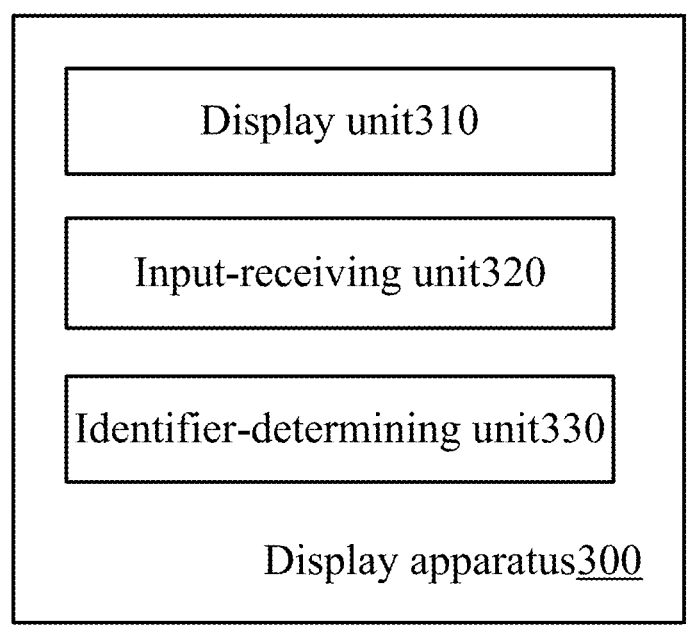
FIG. 3 is a block diagram illustrating an exemplary structure of a display apparatus in accordance with an embodiment of the present invention.

Below, with reference to FIG. 3, a display apparatus in accordance with an embodiment of the present invention will be explained. FIG. 3 is a block diagram illustrating an exemplary structure of a display apparatus 300 in accordance with an embodiment of the present invention. The display apparatus 300 can be used in an electronic device. As shown in FIG. 3, the display apparatus 300 in this embodiment comprises: a display unit 310, an input-receiving unit 320, and an identifier-determining unit 330. The various modules in the display apparatus 300 perform the respective steps/functions of the above-described display method in FIG. 1, and for the sake of brevity, they are no more described in detail.

For example, the display unit 310 can display a first application-interface. In the first application-interface, first identifiers of at least one first application may be displayed in a first display effect, and the at least one first application is stored on server-side. According to one example of the present invention, the first application-interface can be a recommended application-interface. The recommended application-interface can be used to display first identifiers of such first applications, for users, that are stored on server-side but not stored nor installed in the electronic device. According to another example of the present invention, displaying first identifiers of at least one first application in a first display effect may comprise: displaying first identifiers of at least one first application with a first luminance and/or a first chrominance. For example, first identifiers may be displayed with a relative low luminance; also, first identifiers may be displayed with a black-white-grey color scheme.

Further, according to another example of the present invention, the display apparatus 300 may further comprise an information-receiving unit and an identifier-generating unit (not shown). Before the first application-interface is displayed or when a user opens the first application-interface to display the interface, the information-receiving unit can automatically receive a prompt-information from an application of the server. The identifier-generating unit can generate first application identifiers in the first application-interface according to the prompt-information. For example, the prompt-information of an application may be fed by the server to a terminal device based on the user's previous customized services, alternatively, may be directly sent from the server to the terminal device. In addition, the application corresponding to the prompt-information may be an application newly provided in a predefined time period (for example, within the past month) on server-side. Further, when the first application identifiers are generated in the first application-interface, a maximum number for the first identifiers in the first application-interface can be obtained (a maximum number can be preset for the first identifiers that can be placed in the first application-interface), and the number of the generated first application identifiers is less than or equal to a predefined maximum number of the first identifiers.

Usually, the number of applications stored on the server is quite large, and therefore there is a possibility that not all the identifiers of the applications stored on the server can be displayed in the first application-interface. According to another example of the present invention, in the first application-interface, there may also include an application-store identifier or an identifier indicating that there are more applications stored on server-side; when the user clicks on the identifier, the electronic device can open a link of the application-store and display a corresponding webpage.

The input-receiving unit 320 can receive a selection input from a user. The identifier-determining unit 330 can determine a target identifier in the first identifiers of the at least one first application according to the selection input received by the input-receiving unit 320. According to one example of the present invention, the display apparatus 300 may further comprise a downloading unit (not shown). After the identifier-determining unit 330 determines a target identifier, the download unit can download an application corresponding to the target identifier from the server. Further, according to another example of the present invention, the display apparatus 300 may further comprise an installation unit (not shown), and after the downloading unit downloads the application corresponding to the target identifier from the server, the installation unit can automatically install the application.

After the identifier-determining unit 330 determines the target identifier, the display unit 310 can display second identifiers of at least one second application in a second display effect in the second application-interface, and the at least one second application is stored on electronic-device-side. According to one example of the present invention, the second application-interface may be a local application-interface. The local application-interface can be used to display second identifiers of the second applications stored in the electronic device for user. According to another example of the present invention, after the identifier-determining unit 330 determines the target identifier, the display unit 310 can close the first application-interface and display the second application-interface. Alternatively, after the identifier-determining unit 330 determines the target identifier, the display unit 310 can open the second application-interface and does not close the first application-interface. Specifically, the second application-interface can be provided in an upper layer of the first application-interface.

According to another example of the present invention, the display unit 310 can display second identifiers of at least one second application in a second display effect, and the displaying may comprise: displaying second identifiers of at least one second application with a second luminance and/or a second chrominance. For example, the display unit 310 can display second identifiers with a normal luminance, which is higher than the above-mentioned relatively low luminance; also, it can display second identifiers with a chromatic color scheme.

Further, according to another example of the present invention, the display apparatus 300 may further comprise a switching unit (not shown). In this example, the input-receiving unit 320 can also receive an interface-switching input. The switching unit can execute switching between the first application-interface and the second application-interface according to the interface-switching input. For example, the first application-interface and the second application-interface may be arranged sequentially. The user can perform switching between the pages contained in the first application-interface, for example, with a page-switching input such as a sliding gesture and the like; and when the user conducts the above-described page-switching input such as a sliding gesture and the like in the last page of the first application-interface to view a next page, the first page of the second application-interface can be displayed. That is, the user can perform smooth switching between the first application-interface and the second application-interface, for example, with a page-switching input such as a sliding gesture and the like. Alternatively, the first application-interface and the second application-interface can be provided with a label respectively, and switching between the first application-interface and the second application-interface is done by selecting a label.

Further, the display unit 310 can also display the target identifier and the transformation process of the target identifier from the first display effect to the second display effect in the second application-interface. According to one example of the present invention, the target identifier can be replicated in the second application-interface, and after the target identifier is determined, when the second application-interface is opened, the target identifier can be displayed in the first display effect. Then, the display unit transforms the display of the target identifier from the first display effect to the second display effect.

As described above, the display apparatus 300 may further comprise a downloading unit. After a target identifier in the first identifiers of the at least one first application is determined according to the selection input, the application corresponding to the target identifier is downloaded from the server. According to one example of the present invention, the display unit 310 can determine the transforming progress of the display of the target identifier from the first display effect to the second display effect, according to the downloading progress of the application corresponding to the target identifier. For example, as described above, when the target identifier is displayed in the first display effect, the target identifier is displayed in gray, and the display unit 310 can turn the target identifier gradually into colorful along a top-to-bottom direction according to the downloading progress of the application corresponding to the target identifier Specifically, as the downloading progress increases, the color proportion of the target identifier becomes larger gradually, until finally the entire target identifier turns into colorful, so as to notify the use that the application is completely downloaded to the local.

In addition, as described above, according to another example of the present invention, the display apparatus 300 may further comprise an installation unit. After the application corresponding to the target identifier is downloaded from the server, the installation unit automatically installs the application corresponding to the target identifier. According to another example of the present invention, the display unit 310 can determine the transforming progress of the display of the target identifier from the first display effect to the second display effect, according to the downloading and installing progress of the application corresponding to the target identifier. For example, as described above, when the target identifier is displayed in the first display effect, the target identifier is displayed in gray with a relatively dark luminance, the display unit 310 can turn the target identifier gradually turned into colorful along a top-to-bottom direction according to the downloading progress of the application corresponding to the target identifier, and still display the target identifier with a relatively dark luminance. Then, the display unit 310 can display the target identifier gradually with a normal luminance along a top-to-bottom direction, according to the installing progress of the application corresponding to the target identifier.

It should be noted that, although in the above examples, a description is given with the case that the display effect of the target identifier is transformed along a top-to-bottom direction as an example, the present invention however is not limited thereto, and for example, the display effect of the target identifier may also be transformed along other directions, such as a left-to-right direction.

In the display apparatus according to this embodiment, when a user selects to download an application stored on server-side, he/she can acquire the download-situation of the application, just by viewing a display effect of an identifier corresponding to the application being downloaded; thus, the display interface during application-download is simplified, without affecting the user in viewing other displayed contents in the current page, and the user experience is improved.

In addition, according to another embodiment of the present invention, the display apparatus shown in FIG. 3 may further comprise a removing unit. After the identifier-determining unit determines a target identifier in the first identifiers of the at least one first application according to the selection input, the removing unit can remove the target identifier from the first application-interface, so as to indicate that the target identifier has been selected by the user and will be downloaded to the terminal device. At this time, the number of the first application identifiers in the first application-interface is less than the original number of the first identifiers in the first application-interface (for example, the maximum number of the first identifiers). In the case that the display apparatus comprises an information-receiving unit and an identifier-generating unit, the identifier-generating unit can supplementarily generate a new first application identifier in the first application-interface according to a prompt-information received by the information-receiving unit. Thus, the number of the first application identifiers in the first application-interface is kept equal to the maximum number of the first identifiers in the first application-interface.

Figure 4:
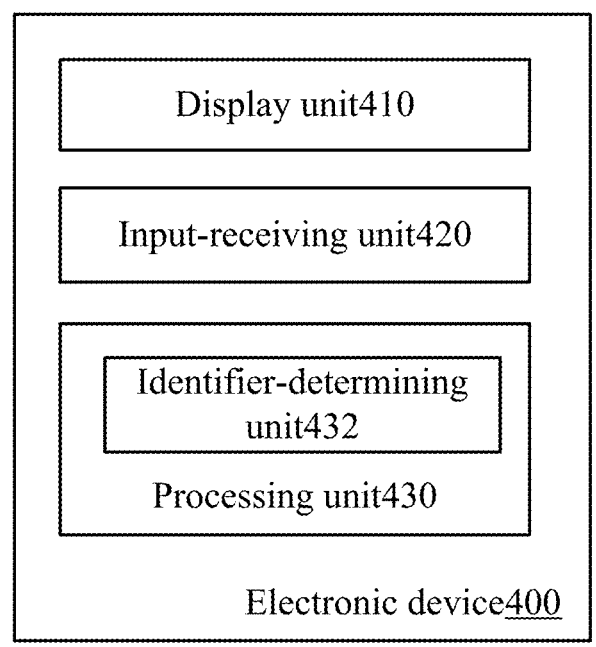
FIG. 4 is a block diagram illustrating an exemplary structure of an electronic device in accordance with an embodiment of the present invention.

Below, with reference to FIG. 4, an electronic device in accordance with an embodiment of the present invention will be described. FIG. 4 is a block diagram illustrating an exemplary structure of an electronic device 400 in accordance with an embodiment of the present invention. As shown in FIG. 4, the electronic device 400 in this embodiment comprises a display unit 410, an input-receiving unit 420 and a processing unit 430. The various modules in the electronic device 400 perform the respective steps/functions of the above-described display method in FIG. 1, and for the sake of brevity, they are no more described in detail.

For example, the display unit 410 can display a first application-interface. In the first application-interface, first identifiers of at least one first application may be displayed in a first display effect, and the at least one first application is stored on server-side. According to one example of the present invention, the first application-interface may be a recommended application-interface. The recommended application-interface can be used to display first identifiers of such first applications, for users, that are stored on server-side but not stored nor installed in the electronic device. According to another example of the present invention, displaying first identifiers of at least one first application in a first display effect may comprise: displaying first identifiers of at least one first application with a first luminance and/or a first chrominance. For example, first identifiers may be displayed with a relative low luminance; also, first identifiers may be displayed with a black-white-grey color scheme.

Further, according to another example of the present invention, the display unit 400 may further comprise an information-receiving unit and an identifier-generating unit (not shown). Before the first application-interface is displayed or when a user opens the first application-interface to display the interface, the information-receiving unit can automatically receive a prompt-information from an application of the server. The identifier-generating unit can generate first application identifiers in the first application-interface according to the prompt-information. For example, the prompt-information of an application may be fed by the server to a terminal device based on the user's previous customized services, alternatively, may be directly sent from the server to the terminal device. In addition, the application corresponding to the prompt-information may be an application newly provided in a predefined time period (for example, within the past month) on server-side. Further, when the first application identifiers are generated in the first application-interface, a maximum number for the first identifiers in the first application-interface can be obtained (a maximum number can be preset for the first identifiers that can be placed in the first application-interface), and the number of the generated first application identifiers is less than or equal to a predefined maximum number of the first identifiers.

Usually, the number of applications stored on the server is quite large, and therefore there is a possibility that not all the identifiers of the applications stored on the server can be displayed in the first application-interface. According to another example of the present invention, in the first application-interface, there may also include an application-store identifier or an identifier indicating that there are more applications stored on server-side; when the user clicks on the identifier, the electronic device can open a link of the application-store and display a corresponding webpage.

The input-receiving unit 420 can receive a selection input from a user. The processing unit 430 may comprise an identifier-determining module 432. The identifier-determining module 432 can determine a target identifier in the first identifiers of the at least one first application, according to the selection input received by the input-receiving unit 420. According to one example of the present invention, the electronic device 400 may further comprise a data-transfer unit (not shown). After the identifier-determining module 432 determines a target identifier, the data-transfer unit can download an application corresponding to the target identifier from the server. Further, according to another example of the present invention, the processing unit 430 may further comprise an installation module (not shown), and after the data-transfer unit downloads the application corresponding to the target identifier from the server, the installation module can automatically install the application.

After the identifier-determining unit 432 determines the target identifier, the display unit 410 can display second identifiers of at least one second application in a second display effect in the second application-interface, and the at least one second application is stored on electronic-device-side. According to one example of the present invention, the second application-interface may be a local application-interface. The local application-interface can be used to display second identifiers of the second applications stored in the electronic device for user. According to another example of the present invention, after the identifier-determining module 432 determines the target identifier, the display unit 410 can close the first application-interface and display the second application-interface. Alternatively, after the identifier-determining unit 432 determines the target identifier, the display unit 410 can open the second application-interface and does not close the first application-interface. Specifically, the second application-interface can be provided in an upper layer of the first application-interface.

According to another example of the present invention, the display unit 410 can display second identifiers of at least one second application in a second display effect, and the displaying may comprise: displaying second identifiers of at least one second application with a second luminance and/or a second chrominance. For example, the display unit 410 can display second identifiers with a normal luminance, which is higher than the above-mentioned relatively low luminance; also, it can display second identifiers with a chromatic color scheme.

Further, according to another example of the present invention, the electronic device 400 may also comprise a switching unit (not shown). In the present example, the input-receiving unit 420 can also receive an interface-switching input. The switching unit can execute switching between the first application-interface and the second application-interface according to the interface-switching input. For example, the first application-interface and the second application-interface may be arranged sequentially. The user can perform switching between the pages contained in the first application-interface, for example, with a page-switching input such as a sliding gesture and the like; and when the user conducts the above-described page-switching input such as a sliding gesture and the like in the last page of the first application-interface to view a next page, the homepage of the second application-interface can be displayed. That is, the user can perform smooth switching between the first application-interface and the second application-interface, for example, with a page-switching input such as a sliding gesture and the like. Alternatively, the first application-interface and the second application-interface can be provided with a label respectively, and switching between the first application-interface and the second application-interface is done by selecting a label.

Further, the display unit 410 can also display the target identifier and the transformation process of the target identifier from the first display effect to the second display effect in the second application-interface. According to one example of the present invention, the target identifier can be replicated in the second application-interface, and after the target identifier is determined, when the second application-interface is opened, the target identifier can be displayed in the first display effect. Then, the display unit transforms the display of the target identifier from the first display effect to the second display effect.

As described above, the electronic device 400 may further comprise a data-transfer unit. After a target identifier in the first identifiers of the at least one first application is determined according to the selection input, the data-transfer unit downloads an application corresponding to the target identifier from the server. According to one example of the present invention, the display unit 410 can determine the transforming progress of the display of the target identifier from the first display effect to the second display effect, according to the downloading progress of the application corresponding to the target identifier. For example, as described above, when the target identifier is displayed in the first display effect, the target identifier is displayed in gray, and the display unit 310 can turn the target identifier gradually turned into colorful along a top-to-bottom direction according to the downloading progress of the application corresponding to the target identifier. Specifically, as the downloading progress increases, the color proportion of the target identifier becomes larger gradually, until finally the entire target identifier turns into colorful, so as to notify the use that the application is completely downloaded to the local.

In addition, as described above, according to another example of the present invention, the electronic device 400 may further comprise an installation module. After the application corresponding to the target identifier is downloaded from the server, the installation module automatically installs the application corresponding to the target identifier. According to another example of the present invention, the display unit 410 can determine the transforming progress of the display of the target identifier from the first display effect to the second display effect, according to the downloading and installing progress of the application corresponding to the target identifier. For example, as described above, when the target identifier is displayed in the first display effect, the target identifier is displayed in gray with a relatively dark luminance, the display unit 410 can turn the target identifier gradually turned into colorful along a top-to-bottom direction according to the downloading progress of the application corresponding to the target identifier, and still display the target identifier with a relatively dark luminance. Then, the display unit 410 can display the target identifier gradually with a normal luminance along a top-to-bottom direction, according to the installing progress of the application corresponding to the target identifier.

It should be noted that, although in the above examples, a description is given with the case that the display effect of the target identifier is transformed along a top-to-bottom direction as an example, the present invention however is not limited thereto, and for example, the display effect of the target identifier may also be transformed along other directions, such as a left-to-right direction.

In the electronic device according to this embodiment, when a user selects to download an application stored on server-side, he/she can acquire the download-situation of the application, just by viewing a display effect of an identifier corresponding to the application being downloaded; thus, the display interface during application-download is simplified, without affecting the user in viewing other displayed contents in the current page, and the user experience is improved.

In addition, according to another embodiment of the present invention, the processing unit 430 in the electronic device shown in FIG. 4 may further comprise a removing module. After the identifier-determining unit determines a target identifier in the first identifiers of the at least one first application according to the selection input, the removing module can remove the target identifier from the first application-interface, so as to indicate that the target identifier has been selected by the user and will be downloaded to the terminal device. At this time, the number of the first application identifiers in the first application-interface is less than the original number of the first identifiers in the first application-interface (for example, the maximum number of the first identifiers). In the case that the electronic device comprises an information-receiving unit and an identifier-generating unit, the identifier-generating unit can supplementarily generate a new first application identifier in the first application-interface according to an prompt-information received by the information-receiving unit. Thus, the number of the first application identifiers in the first application-interface is kept equal to the maximum number of the first identifiers in the first application-interface.

The ordinary skill in the art can understand that, the units and algorithm steps in the various examples described in connection with the embodiments disclosed herein, can be realized by electronic hardware, computer software, or a combination of both. And a software module can be placed in any form of computer storage medium. To clearly illustrate the interchangeability of hardware and software, in the above description, configurations and steps in the various examples have been described in general in accordance with functions. Whether these functions are implemented in form of hardware or software is depended on particular applications and design constraints. The skilled in the art can achieve the described functions in different ways for each particular application, but such achievement should not be considered as beyond the scope of the present invention.

The skilled in the art should understand that, various modifications, combinations, sub-combinations and replacements can be made to the present invention, depending on design requirements and other factors insofar as they are within the scope of the appended claims and their equivalents.

What is claimed is:

1. A display method used in an electronic device, the display method comprising:
    displaying a first application-interface, wherein, first identifiers of at least one first application are displayed in a first display effect in the first application-interface, and the at least one first application is stored on server-side;
    receiving a selection input from a user;
    determining a target identifier in the first identifiers of the at least one first application according to the selection input;
    displaying a second application-interface, wherein, second identifiers of at least one second application are displayed in a second display effect in the second application-interface, and the at least one second application is stored on electronic-device-side;
    displaying the target identifier and the transformation process of the target identifier from the first display effect to the second display effect in the second application-interface.

2. The display method according to claim 1, wherein, switching between the first application-interface and the second application-interface can be done through an interface-switching input.

3. The display method according to claim 1, after a target identifier in the first identifiers of the at least one first application is determined according to the selection input, further comprising:
    removing the target identifier from the first application-interface.

4. The display method according to claim 1, after a target identifier in the first identifiers of the at least one first application is determined according to the selection input, further comprising:
    downloading an application corresponding to the target identifier from the server.

5. A display method according to claim 4, wherein, transforming the display of the target identifier from the first display effect to the second display effect, comprises:
    determining the transforming progress of the display of the target identifier from the first display effect to the second display effect, according to the downloading progress of the application corresponding to the target identifier.

6. The display method according to claim 4, after the application corresponding to the target identifier is downloaded from the server, further comprising:
    automatically installing the application corresponding to the target identifier.

7. A display method according to claim 6, wherein, transforming the display of the target identifier from the first display effect to the second display effect, comprises:
    determining the transforming progress of the display of the target identifier from the first display effect to the second display effect, according to the downloading and installing progress of the application corresponding to the target identifier.

8. The display method according to claim 1, wherein,
    displaying first identifiers of at least one first application in a first display effect comprises:
    displaying first identifiers of at least one first application with a first luminance and/or a first chrominance;
    displaying second identifiers of at least one second application in a second display effect comprises:
    displaying second identifiers of at least one second application with a second luminance and/or a second chrominance;
    the first luminance is less than the second luminance.

9. The display method according to claim 1, further comprising:
    automatically receiving a prompt-information from an application of the server;
    generating the first application identifiers in the first application-interface according to the prompt-information, wherein, the number of the generated first application identifiers is less than or equal to a predefined maximum number of the first identifiers.

10. A display apparatus used in an electronic device, the display apparatus comprising:
    a display unit, configured for displaying a first application-interface, wherein, first identifiers of at least one first application are displayed in a first display effect in the first application-interface, and the at least one first application is stored on server-side;
    an input-receiving unit, configured for receiving a selection input from a user;

an identifier-determining unit, configured for determining a target identifier in the first identifiers of the at least one first application according to the selection input;

the display unit is also configured for displaying a second application-interface, wherein, second identifiers of at least one second application are displayed in a second display effect in the second application-interface, and the at least one second application is stored on electronic-device-side; and the display unit is also configured for displaying the target identifier and the transformation process of the target identifier transformed from the first display effect to the second display effect in the second application-interface.

11. The display apparatus according to claim 10, wherein,
the input-receiving unit is also configured for receiving an interface-switching input,
the display apparatus further comprises:
a switching unit, configured for switching between the first application-interface and the second application-interface according to the interface-switching input.

12. display apparatus according to claim 10, further comprising:
a removing unit, configured for: after a target identifier in the first identifiers of the at least one first application is determined according to the selection input, removing the target identifier from the first application-interface.

13. display apparatus according to claim 10, further comprising:
a downloading unit, configured for: after a target identifier in the first identifiers of the at least one first application is determined according to the selection input, downloading an application corresponding to the target identifier from the server.

14. The display apparatus according to claim 13, wherein,
the display unit determines the transforming progress of the display of the target identifier from the first display effect to the second display effect, according to the downloading progress of the application corresponding to the target identifier.

15. display apparatus according to claim 13, further comprising:
an installation unit, configured for: after the application corresponding to the target identifier is downloaded from the server, automatically installing the application corresponding to the target identifier.

16. The display apparatus 16 according to claim 15, wherein,
the display unit determines the transforming progress of the display of the target identifier from the first display effect to the second display effect, according to the downloading and installing progress of the application corresponding to the target identifier.

17. The display apparatus according to claim 10, further comprising:
an information-receiving unit, configured for automatically receiving a prompt-information from an application of the server;
an identifier-generating unit, configured for generating the first application identifiers in the first application-interface according to the prompt-information, wherein, the number of the generated first application identifiers is less than or equal to a predefined maximum number of the first identifiers.

18. An electronic device, comprising:
a display unit, configured for displaying a first application-interface, wherein, first identifiers of at least one first application are displayed in a first display effect in the first application-interface, and the at least one first application is stored on server-side;
an input-receiving unit, configured for receiving a selection input from a user;
a processing unit, comprising:
a target-determining module, configured for determining a target identifier in the first identifiers of the at least one first application according to the selection input;
the display unit is also configured for displaying a second application-interface, wherein, second identifiers of at least one second application are displayed in a second display effect in the second application-interface, and the at least one second application is stored on electronic-device-side;
the display unit is also configured for displaying the target identifier and the transformation process of the target identifier transformed from the first display effect to the second display effect in the second application-interface.

* * * * *